(12) United States Patent
Moisio et al.

(10) Patent No.: US 8,219,236 B2
(45) Date of Patent: Jul. 10, 2012

(54) METHOD FOR CREATING A CUTTING PLAN FOR A STRIP-LIKE MATERIAL

(75) Inventors: Juha Moisio, Vihti (FI); Robert Reinius, Espoo (FI); Simo Säynevirta, Espoo (FI); Ilkka Erkkilä, Helsinki (FI)

(73) Assignee: ABB OY, Helsinki (FI)

( * ) Notice: Subject to any disclaimer, the term of this patent is extended or adjusted under 35 U.S.C. 154(b) by 1122 days.

(21) Appl. No.: 12/007,889

(22) Filed: Jan. 16, 2008

(65) Prior Publication Data

US 2008/0288100 A1 Nov. 20, 2008

(30) Foreign Application Priority Data

Feb. 1, 2007 (EP) .................................. 07002189

(51) Int. Cl.
*G01B 5/28* (2006.01)
*D21F 7/06* (2006.01)
(52) U.S. Cl. ........ 700/122; 700/125; 700/128; 162/194; 162/198; 162/263
(58) Field of Classification Search .................. 700/122, 700/125, 128; 162/194, 198, 263
See application file for complete search history.

(56) References Cited

U.S. PATENT DOCUMENTS

| 3,503,290 | A | * | 3/1970 | Couvreur et al. ................. 83/23 |
| 5,241,483 | A | * | 8/1993 | Porret et al. ................... 700/125 |
| 5,578,229 | A | | 11/1996 | Barnekov et al. |
| 6,778,681 | B2 | | 8/2004 | Garms et al. |
| 7,120,515 | B2 | * | 10/2006 | Floeder et al. ................. 700/122 |
| 7,520,962 | B2 | * | 4/2009 | Muench et al. ................. 162/263 |
| 7,702,414 | B2 | * | 4/2010 | Okura et al. .................. 700/127 |
| 2005/0144094 | A1 | * | 6/2005 | Floeder et al. ................. 705/27 |
| 2006/0076119 | A1 | | 4/2006 | Muench et al. |

(Continued)

FOREIGN PATENT DOCUMENTS

EP 1 614 801 A1 1/2006

(Continued)

OTHER PUBLICATIONS

Urs Buehlmann et al., "Lumber yield optimization software validation and performance review" Robotics and Computer Integrated Manufacturing 17, 2001, pp. 27-32.

(Continued)

*Primary Examiner* — Albert DeCady
*Assistant Examiner* — Douglas Lee
(74) *Attorney, Agent, or Firm* — Buchanan Ingersoll & Rooney PC

(57) ABSTRACT

A method for creating a cutting plan for a strip-like material for maximizing a quality yield of the process is invented. In the method a cutting plan for a strip-like material is made based on end-product data, and the strip-like material is driven at a production speed in a manufacturing machine or in a finishing machine, and strip length data is recorded. A chart of the strip-like material characteristics is generated and stored in a memory. The recorded strip length data and the chart of the strip-like material characteristics is calibrated with calibration data in a winding process, and during a set change in the winding process the cutting plan for the strip-like material is optimized for maximizing a quality yield of the process based on the end-product data and the calibrated chart of the strip-like material characteristics, and a revised cutting plan is created from the optimization result.

20 Claims, 5 Drawing Sheets

U.S. PATENT DOCUMENTS

2006/0090319 A1  5/2006  Howe

FOREIGN PATENT DOCUMENTS

WO  WO 2006/117124 A2  11/2006

OTHER PUBLICATIONS

Mikael Rönnqvist, "A method for the cutting stock problem with different qualities" European Journal of Operational Research 83, 1995, pp. 57-68.

Paul E. Sweeney et al., "One-dimensional cutting stock decisions for rolls with multiple quality grades" European Journal of Operational Research 44, 1990, pp. 224-231.

R. Ghodsi et al., "An Adaptive Fuzzy Algorithm for Cut Sequencing of Solid Wood in Furniture Component Production" International Symposium on Intelligent Control, 2002, pp. 246-251.

European Search Report dated Jul. 19, 2007.

European Search Report in Application No. 08001148.9-2206 dated Jun. 10, 2008.

* cited by examiner

METHOD FOR CREATING A CUTTING PLAN FOR A STRIP-LIKE MATERIAL

FIELD OF THE INVENTION

The present invention relates to a method for creating a cutting plan for a strip-like material as defined in the preambles of claims 1 and 20.

BACKGROUND OF THE INVENTION

In many industries producing flat end-products, e.g. paper, steel and other metals, flat-sheet chemicals like polymers and film industries, the entire production process is monitored. The quality of the process is measured using on-line measurement and control systems, such as quality control systems, scanning the strip-like material continuously or using imaging systems, providing full strip imaging of the quality and defect data.

This quality and defect information is typically used to control the production process itself. During the production process, the flat product may stretch or shrink, and in addition to this there are typically length direction losses, slabbing, that take out some material on top or in the middle of the reel. As a result of all these changes in the length at each of the processing steps, the current positions of quality and defect data in the reel is typically not known exactly.

One of the final processing steps of flat end-products is cutting. The main reason for postponing the cutting step towards the end of the production is that this allows the simultaneous processing of larger quantities and the design of more generic production equipment that do not depend on certain individual end-product dimensions. Determining a cutting plan faces the following difficulties: how to match the product dimensions required by the customers to those of the equipment and how to group end-customer products according to their material property and quality requirements and how to minimize the wastage of the material to be cut. This problem is referred to as the trim-loss problem or cutting stock problem.

In the cutting process a wound up product, a reel or a coil, is cut into smaller products. This is done using special slitting devices and suitable winding systems. What it means in practice is that a larger unit will be divided into smaller units, after which further processing or packaging takes place. The end-products can be wound up in rolls, machine direction cutting, or cut into sheets, machine and cross direction cutting.

Because of the quality and defect variations in the reel or coil to be cut and their inaccurate position information, it may happen that a cut customer roll that is thought to be of perfect quality ends up having severe defects in it.

In the case of a paper roll this would in the worst case lead to customer rejects at the printing house, as the product sold as premium is actually of poor quality. The customer claims cause financial costs through penalties and extra transportation and handling needed. In addition to these, even more severe effect may be the end customer switching suppliers due to the poor quality.

These losses due to in-accuracies may be up to several percent of the total production capacity, thus making their financial impact to the profitability of the production process significant.

SUMMARY OF THE INVENTION

The objective of the invention is to eliminate the aforementioned drawbacks and to create a method for creating a cutting plan for a strip-like material. The objective will be achieved as presented in the independent claims 1 and 20. The dependent claims describe various embodiments of the invention.

THE INVENTED METHOD

A method for creating a cutting plan for a strip-like material for maximizing a quality yield of the process is invented. A cutting plan for a strip-like material is made based on end-product data. The strip-like material is driven at a production speed in a manufacturing machine or in a finishing machine, and strip length data is recorded. A chart of the strip-like material characteristics is generated and stored in a memory. The strip length data is re-measured in a winding process. The recorded strip length data and the chart of the strip-like material characteristics are calibrated with calibration data in the winding process where the calibration data is the difference between the re-measured strip length and the recorded strip length. During a set change in the winding process the cutting plan for the strip-like material is optimized for maximizing a quality yield of the process based on the end-product data and the calibrated chart of the strip-like material characteristics. The revised cutting plan is created from the optimization result.

A software product data recording medium in which program code is stored, which program code will cause a computer to perform a method for creating a cutting plan for a strip-like material for maximizing a quality yield of the process. A cutting plan for a strip-like material is made based on end-product data. The strip-like material is driven at a production speed in a manufacturing machine or in a finishing machine, and strip length data is recorded. A chart of the strip-like material characteristics is generated and stored in a memory. The strip length data is re-measured in a winding process. The recorded strip length data and the chart of the strip-like material characteristics are calibrated with calibration data in the winding process where the calibration data is the difference between the re-measured strip length and the recorded strip length. During a set change in the winding process the cutting plan for the strip-like material is optimized for maximizing a quality yield of the process based on the end-product data and the calibrated chart of the strip-like material characteristics. The revised cutting plan is created from the optimization result.

The revised cutting plan comprises cutting patterns, i.e. sets of item widths to be cut, and number of sets to be cut.

Calibration data is made by re-measuring the strip length of the moving strip and comparing the re-measured length to the length measured in previous process phases at the same location. For instance, when the strip is moving at the unwinding its length is continuously re-measured by a known method. If the strip length data is recorded by making calibration marks, i.e. position marks, to the strip, the calibration data is made every time a calibration mark is read and the corresponding strip length data from a memory is obtained. The calibration data, the position difference, is the difference between the re-measured strip length and the recorded strip length.

When the recorded strip length data is calibrated with the calibration data the recorded strip length data is fixed with the position difference. The value of the recorded strip length data is decreased or increased at the calibration mark and at all succeeding calibration marks by the amount of the calibration data.

When the chart of the strip-like material characteristics is calibrated with the calibration data the chart of the strip-like material characteristics is fixed with the position difference. The recorded strip length data in the chart of the strip-like material characteristics is fixed with the position difference, where the value of the recorded strip length data in the chart is decreased or increased at the calibration mark and at all succeeding calibration marks by the amount of the calibration data. The chart comprises information connected to the recorded strip length data, and that information is also brought into conformity with the calibrated recorded strip length data.

Calibration, fixing of the position, is performed for getting an up-dated chart of the strip-like material having the current information on the anomalies and their positions in the strip. By calibration the previously measured data is up-dated with the current re-measured data, e.g. the recorded strip length data at the calibration mark is adjusted based on current re-measured strip length data.

The method for creating a cutting plan for a strip-like material is efficient in maximizing a quality yield of the process. The maximized quality yield reduces the waste of the strip-like material, i.e. the trim waste, as well as increases the correspondences between the quality of the final products of the cutting process and the quality requirements of end-products set by customers. The increased quality correspondence increases customer satisfaction and decreases quality costs arisen from customer reclamations. The method takes into account the actual and precise quality information of the strip-like material. The length position fix for the data obtained from quality measurements is calculated based on the current on-line re-measured length position data.

The optimization of the cutting plan is made in the phase where the realized quality of the strip to be cut is known in the form of the chart of the strip-like material characteristics, and the following phase is the actual cutting. The calibrated quality and defect information of the strip is used as an input for the optimization and the optimization result is further the input to the machine performing the cutting. In the optimization the length position fixed data from on-line quality measurements and defect detection systems, which data is obtained during the manufacturing and finishing phases of the strip, and the quality requirement data of end-products are used for maximizing quality yield.

The end-product data used in the optimization is derived from customers' orders. Its details vary depending on the type of the strip-like material, as customers' requirements are different for a paper or board roll than for a hot or cold rolled steel coil, for instance. The end-product data comprises for instance end-product dimensions like width, length, thickness and diameters of rolls/coils, one or more quality parameters related to the surface, the composition and the hardness of the end-product, and a quality class including information on end-product grade, allowable number of splices and limits in the number of specific defects or defects that are not allowed at all. A quality class contains also information on the effect of found defects and quality deviations in a roll/coil on the quality classification of the roll/coil.

The strip-like material is usually wound into reels or coils in a manufacturing machine, e.g. paper or board machine or rolling mill, or in a finishing machine, e.g. coating machine, super-calender or cold-roller. Then the reel/coil is located on an unwind stand in the unwind section in the beginning of the winding process and unwound.

The cutting section of the winding process comprises a slitter-winder. In the slitter-winder there is a slitting device having slitters which are placed side by side in the cross direction of the strip and by which the strip is cut into several component strips. The slitters are generally sharp discs or knifes. The positions of slitters of a slitting device in the slitter-winder are set according to the cutting patterns.

In an embodiment of the invention the revised cutting plan is calibrated in the cross direction of the strip in the slitter-winder by detecting a strip edge position and a slitting device position. Then the position in the cross direction of the strip is fixed in the revised cutting plan in the slitter-winder by detecting a strip edge position and a slitting device position. This improves the accuracy of the cutting as the positions of the cutting slitters in the cross direction of the strip may vary as the position of the strip in the cross direction of the strip on the spool typically varies somewhat from reel to reel. By means of the calibration, the fixing of the position, it can be specified into what final product of the cutting process defects or quality deviations near the strip cutting slitters are ending up.

In a further embodiment of the invention the strip-like material is then cut according to the revised cutting plan into one or several final products of the cutting process, and for each final product of the cutting process a chart of the strip-like material characteristics is generated based on the cutting patterns in the to the cross direction fixed revised chart. The final product of the cutting process is a paper roll or metal coil, for instance.

In a windup section of the winding process the final products of the cutting process, for instance the customer rolls/coils of a particular width and diameter, are wound.

In another embodiment of the invention a final product of the cutting process is classified based on for the final product of the cutting process generated chart of the strip-like material characteristics creating a quality class for the final product of the cutting process. Further, the quality class of the final product of the cutting process is compared to the quality class in the end-product data and if the quality class of the final product of the cutting process is lower than the quality class in end-product data the final product of the cutting process is rejected or downgraded. Different customers have specific quality restrictions and rolls/coils that don't satisfy requirements are not sent to the customer. For instance, when paper rolls were sold with premium quality to a printing house and the rolls don't satisfy stated needs, an early rejection of them saves costs is the form of avoided penalties and extra transportation and handling costs.

In one embodiment of the invention the strip-like material is repaired in the winding process. The moving strip-like material is brought to a stop at a location which is to be repaired on the basis of the information stored in the chart of the strip-like material characteristics and the strip length data. Then the detected defect parameter or the quality deviation is repaired, for instance a tape is pasted over a hole in case of a paper web, or a hole in a metal-strip is welded. The reparation, i.e. patched defect data, is marked to the chart of the strip-like material characteristics and to for the final product of the cutting process generated chart of the strip-like material characteristics. The quality class of the final product of the cutting process is upgraded based on patched defect data.

The chart of the strip-like material characteristics contains information on the found anomalies in the strip and their locations in the strip. It comprises detected defect parameters, the positions of the detected defect parameters in the cross and length direction of the strip, quality parameter deviations and the positions of quality parameter deviations in the cross and length direction of the strip.

The defect parameter of a strip-like material comprises for instance a hole, a spot, a dirt particle, a wrinkle, a streak, a slime spot, an edge crack, a bump, a dent roll marks, a scratch, a slag seam, bubbles (plastics), gel (plastics), dents, thickness change, color change and a color spot. Basically, the defect parameter can also be any abnormality which can be detected by image analysis, e.g. formation, watermarks, laid lines.

The quality parameters of the strip-like material quality are often measured on a continuous basis. Usually physical on-line real-time measurements are made with measurement sensors. The measured quality parameter comprises for instance one or several from the following: basis weight, density, moisture content, fibre orientation, flatness, formation, caliper, thickness, smoothness, hardness, roughness, brightness, gloss, opacity, porosity, transparency and color.

In an embodiment of the invention the chart of the strip-like material characteristics is generated by observing the strip by at least one camera for creating at least one digital image consisting of pixels for defect parameter detection. The detected defect parameters and the positions of the detected defect parameters in a cross and in a length direction of the strip are recorded. One or several quality parameters of the strip-like material quality are measured with one or more physical on-line measurements. The measured quality parameters of the strip-like material quality are compared to a reference value for determining deviation. The quality parameter deviations and the positions of the quality parameter deviations in the cross and the length direction of the strip are recorded.

In one embodiment the strip length data is recorded by making calibration marks to the strip. The calibration marks, i.e. position marks, are made with a color marker at the strip edge, for instance. The calibration mark has a code which includes information. At unwinding the recorded strip length data is defined by reading the calibration marks with a color mark sensor. The calibration data is made by defining the strip length data and comparing the strip length data with the recorded strip length data, i.e. at the unwinding the calibration marks are detected and their locations are compared with the expected locations based on the information of the recorded strip length data. The calibration marks are made automatically at specific distances, for example, every 1-5-kilometers, preferably less than 100 m.

In another embodiment Radio-frequency identification (RFID) method is used for recording the strip length data. An RFID tag is an object that can be applied to or incorporated into a product for the purpose of identification using radio waves. RFID tags are attached to the strip for recording the strip length data. The RFID tags are positioned to the edge of the moving strip at specific distances. An RFID reader is a device that is used to interrogate an RFID tag and has an antenna that emits radio waves. The RFID tag's antenna picks up signals from an RFID reader and then returns the signal with a unique serial number or other customized information. This serial number or other information unique for the attached RFID tag is stored in a memory together with the strip length data at the attachment point of the RFID tag. The attaching of the RFID tags is made before winding up the strip in the process.

At unwinding the strip the reading the attached RFID tag supplies the recorded strip length data from the memory.

The RFID tags are glued to the edge of the strip, or a band having the RFID tags is glued to the edge of the strip, for instance. When attaching the RFID tags to the moving strip the RFID tag is moving on the speed of the strip. The RFID tag is pressed against the strip to stick the tag and on the other side of the strip is a counterpart for preventing a mechanical damage of the strip while pressing. The RFID tags are attached to the edge of the strip to the area which is trimmed off later on.

Depending on the RFID tag type it can be read from several meters away and beyond the line of sight of the reader.

The strip length data at the attachment point of the RFID tag is defined by using known methods, for instance by integrating the speed of the moving strip, or by counting rotations of a counting roll where the circumference of the counting roll touches the strip.

The use of RFID tags improves the accuracy of marking the strip and the use of RFID tags as calibration marks, position marks, allows a longer unique serial number or other customized information in comparison to marking the strip with a color marker.

In a further embodiment the calibration marks, the position marks, are made or attached to the strip in pairs. The distance between the two positions marks put into a group of two is clearly shorter than the distance between the groups of two. For instance, the distance between the two positions marks, color marks or RFID tags for example, in the pair is 10 . . . 15 meters and the distance between the pairs of position marks is 50 . . . 5000 meters.

The advantage of the use of two position marks in pairs is a rapid determination of the winding direction of a reel or coil. As the reel or coil can be wound and unwound several times during the process, the winding direction is not necessarily known in the beginning of the unwinding. For the determination of the winding direction two position marks is needed.

The amount of the strip-like material to be included into the optimization can be chosen also to cover all the produced material having a chart of the strip-like material characteristics, and not only the strip-like material, the reel/coil for instance, at the winding process. Then it would cover the reel/coil in the winding process, one or several reels/coils in a queue for the winding process, the strip-like material from the manufacturing machine and in the strip-like material from the finishing machine. The calibration data for all the materials is then available from previous processing phases. As the optimization of the cutting plan is performed during or after every set change at the winding process the method can take into account the strip-like material which was produced for cutting process during the cutting of the previous sets.

The method for creating a cutting plan for a strip-like material is applicable to many industries producing flat end-products, for instance paper, board, steel and other metals, flat-sheet chemicals like polymers and film, woven and non-woven textiles.

In an advantageous embodiment the invented method is performed using a computer. The programs to be used are stored in the memory of the computer or on computer readable media, which can be loaded on a computing device, for example a DVD. These computer readable media have instructions for enabling the computer to execute a method.

BRIEF DESCRIPTION OF THE DRAWINGS

Further features and advantages of the present invention will become apparent from the following detailed description, taken in combination with the appended drawings, in which.

DETAILED DESCRIPTION

The method for creating a cutting plan for a strip-like material is applicable to many manufacturing processes, where for instance paper, board, steel and other metals, flat-sheet chemicals like polymers and film, plastics, woven and non-woven textiles, or any other flat end-product is manufactured. The detailed description with the appended drawings describes an application in the paper industry.

Figure 1:
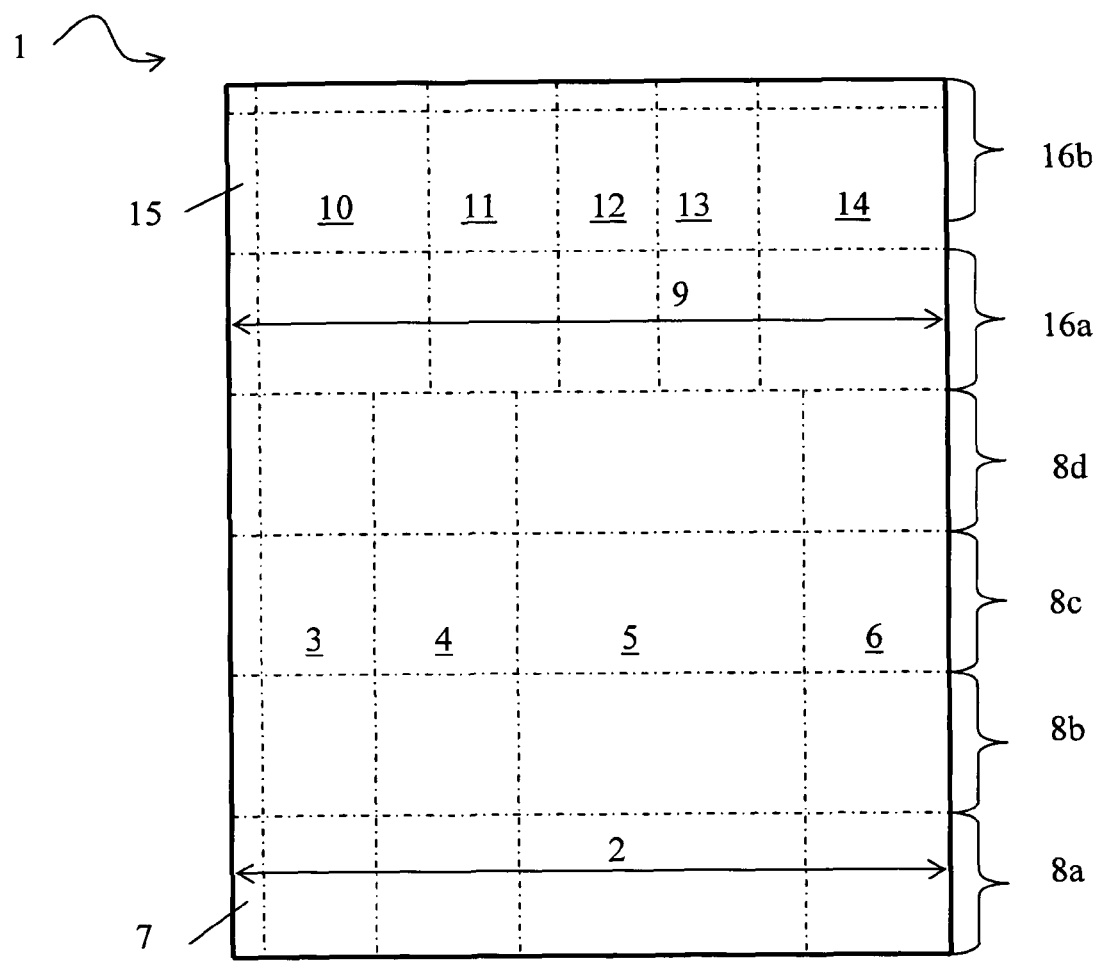
FIG. 1 presents a cutting plan.

In FIG. 1 a cutting plan 1 for a length of a paper web is shown. The plan is made in the production planning phase in a paper mill. The first cutting pattern 2 produces four rolls of paper 3-6 and a trim waste 7 side by side in the cross direction of the paper web. The number of sets to be cut is four 8a-8d. The second cutting pattern 9 produces five rolls of paper 10-14 and a trim waste 15 side by side in the cross direction of the paper web. The number of sets to be cut is two 16a, 16b. A set change which is the removal of completed rolls and starting of new rolls is between the last set 8d with the first cutting pattern 2 and the first set 16a with the second cutting pattern 9.

For the sake of clarity, trimming off of paper web edges is not presented in the figures and not further explained in description. It is a well-known process and made at a re-reeler as well as in the winding process.

Figure 2:
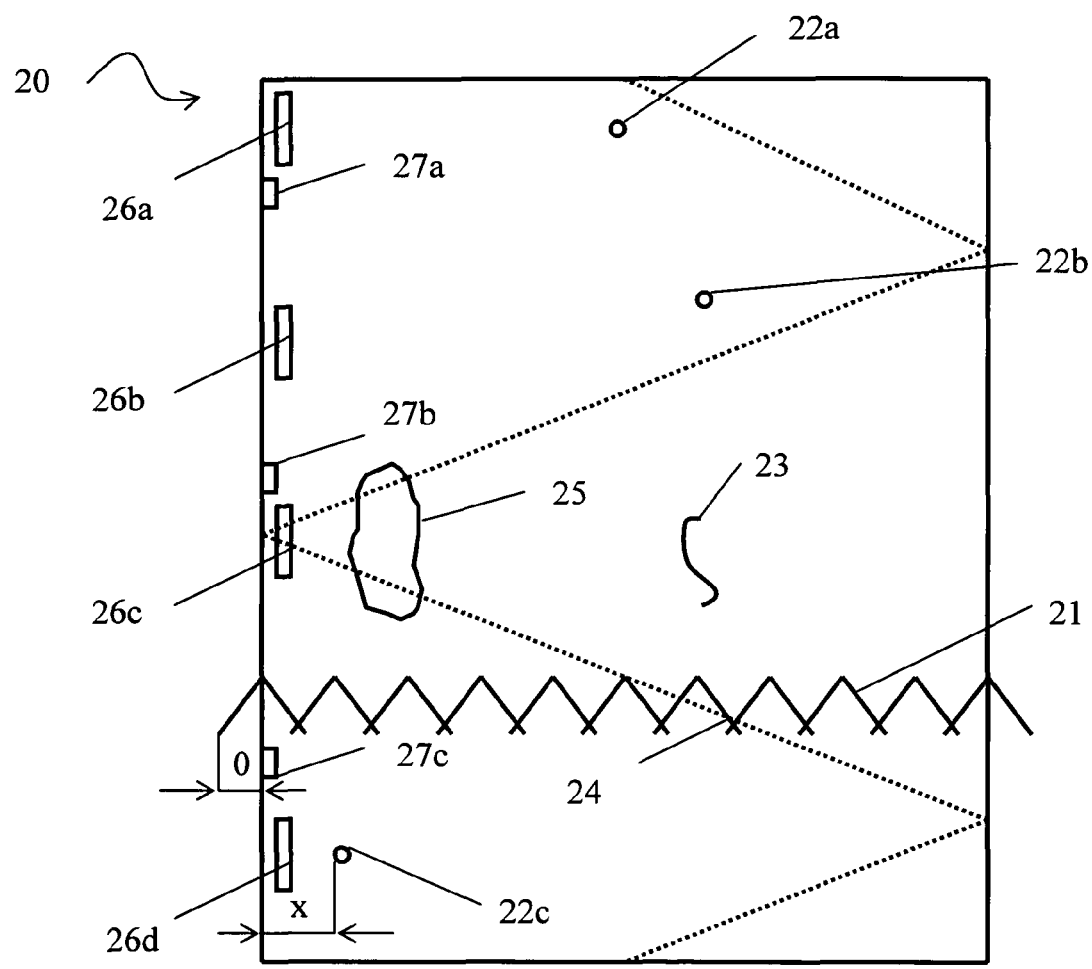
FIG. 2 presents a generation of a chart of paper web characteristics.

In FIG. 2 a generation of a chart of paper web 20 characteristics is shown. The chart of the paper web 20 characteristics contains information on the anomalies in the paper web found during the manufacturing and finishing phases together with the information on the locations of the anomalies.

The chart of the paper web 20 characteristics is generated by observing the paper web 20 with cameras 21 and sensors. Automatic defect parameter detection of paper web is often based on CCD line scan cameras that take pictures of light reflected from the surface of the product at different angles. The web 20 itself is moving, so it is sufficient to use the camera to scan consecutive points of the web at high speed. The image signal from the CCD line scan camera is converted to a digital format and digitally processed in an image-processing unit. The detected defect parameters are visualized in the chart of paper web 20 characteristics. The found defect parameters in the paper web 20 are holes 22a-22c and a streak 23. The positions of the detected defect parameters, the holes 22a-22c and the streak 23, in the cross direction of the paper web 20 are measured by means of the cameras 21. The first camera 21 on the left side of the web 20 measures the distance 0 from a fixed paper machine zero point to the paper web edge. Then by means of the other cameras 21 the distance x from the paper web edge to the found defect parameter, for instance the hole 22c, is measured.

One or several quality parameters of the paper web material quality are measured with one or more physical on-line measurements. The quality parameters are measured with sensors which are moved back and forth across the oncoming web 20, creating a zigzag measurement path 24 as the web 20 moves by the sensor. The measured quality parameters of the strip-like material quality are compared to a reference value for determining deviation. The found quality parameter deviation area 25 in the paper web 20 lacks gloss.

If desired, machine direction position 26a-26d can be marked at the web edge to fix defect parameters and quality parameters machine direction location at the paper machine. The detected defect and quality parameters and their positions in a cross and in a length direction of the paper web are recorded.

The paper web length data is recorded by making calibration marks 27a-27c, position marks, to the paper web. The calibration marks are made with a color marker at the web edge or RFID tags are attached to the web edge, for instance.

The paper web material is wound around a spool to form a reel in a manufacturing machine or in a finishing machine. The reel is often stored before the winding process. At unwinding in the beginning of the winding process the recorded web length data is defined by reading the calibration marks 27a-27c with a color mark sensor or with an RFID reader. The status of the unwinding, e.g. the length to the next stopping position, is continuously updated. The locations of the calibration marks, i.e. the re-measured paper web length data at the calibration marks, are compared with the expected locations based on the information of the recorded paper web length data giving the position difference.

As an example, if from the three calibration marks 27a-27c marked to the FIG. 2 the calibration mark 27b in the middle of is missing, the third calibration mark 27a appears after the first one 27c when reading the calibration marks. As the third calibration mark 27a is read and the paper web length data at the calibration mark 27a is defined, the paper web length data is compared to the recorded paper web length data for the calibration mark 27a. The paper web length data is smaller than the recorded paper web length data, which means that the recorded paper web length data has to be calibrated, i.e. the recorded length position fixed. The calibration difference, the calibration data, is the calibration mark length 27a, the recorded paper web length data for the calibration mark 27a, minus the unwound length, the paper web length data. The unwound length is determined by integrating the production speed in unwinding. When the recorded paper web length data is calibrated with the calibration data, the value of the recorded paper web length data is decreased at the calibration mark 27a and at all succeeding calibration marks by the amount of the calibration data.

The chart of the paper web 20 characteristics is calibrated with the calibration data. There is a length direction loss in the paper web between calibration marks 27c and 27a. When the chart is calibrated with the calibration data obtained from the example, the recorded paper web length data in the chart is fixed with the position difference. The value of the recorded paper web length data in the chart is decreased at the calibration mark 27a and at all succeeding calibration marks by the amount of the calibration data. The chart comprises information connected to the recorded paper web length data, e.g. defect and quality parameter positions, and that information is also brought into conformity with the calibrated recorded paper web length data. This means that the detected defect parameters and the quality parameter deviations which have positions in the length direction of the paper web at or after the calibration mark 27a are getting new positions in the length direction.

Figure 3:
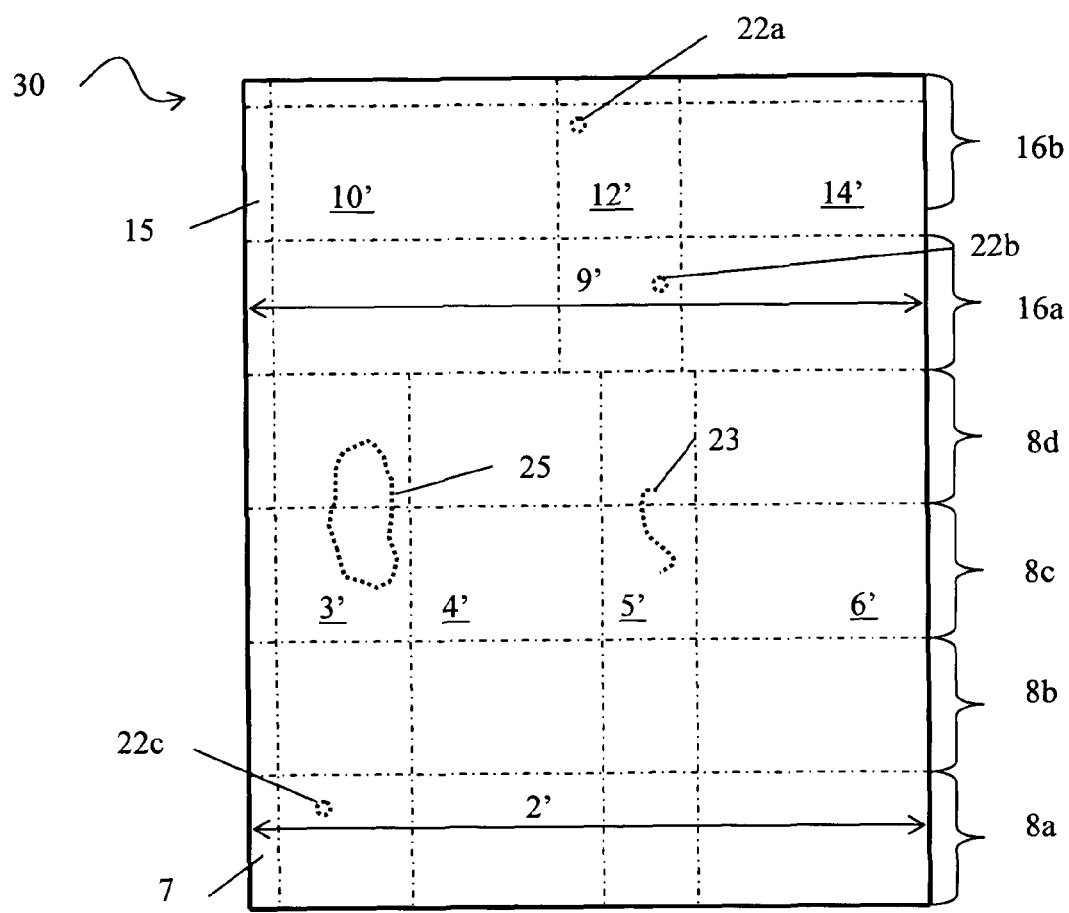
FIG. 3 presents a revised cutting plan.

In FIG. 3 a revised cutting plan 30 for a length of a paper web is shown. When a paper reel is transferred for unwinding the specific paper reel data including the chart of the paper web characteristics is transferred to the database for optimization purposes. Every reel has a unique label for identification. The main goal in optimization is to satisfy an order set of rolls and sheets that must be cut from master reels and at the same time minimize the wastage and maximize the quality yield in the process. The optimization helps to produce as many final products of cutting process for sale as possible and also to supply each customer final products of cutting process with required quality. The cutting plan for the paper web shown in FIG. 1 is optimized for maximizing a quality yield of the cutting process based on the end-product data and the calibrated chart of the paper web characteristics generated in FIG. 2.

For the sake of the clarity, also the detected defect parameters holes 22a-22c and a streak 23 and the quality deviation area 25 are drawn with a dashed line to the FIG. 3.

The first cutting pattern 2' produces still four rolls of paper 3'-6' and a trim waste 7 side by side in the cross direction of the paper web. The widths of the rolls have changed. The second width on the left 3' now contains the whole quality deviation area 25 and one of the defect parameters 22 *c*. The fourth width on the left 5' now contains one of the defect parameters, the streak 23. The number of sets to be cut is four 8*a*-8*d*.

The second cutting pattern 9' produces now three rolls of paper 10', 12' 14' and a trim waste 15 side by side in the cross direction of the paper web. The number of rolls has reduced and the widths of the rolls have changed. The third width on the left 12' now contains two of the defect parameters, the holes 22*a*, 22*b*. The number of sets to be cut is two 16*a*, 16*b*.

Figure 4:
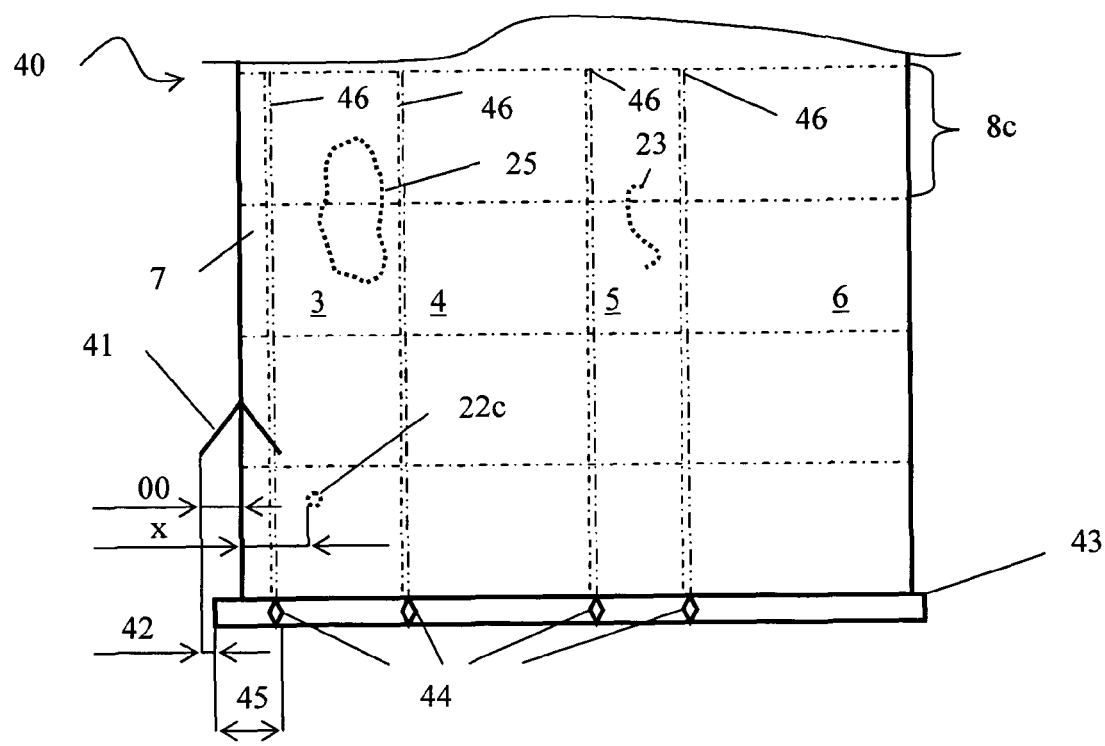
FIG. 4 presents a calibration of the revised cutting plan to the cross direction of the paper web.

In FIG. 4 a calibration of the revised cutting plan 40 for a length of a paper web to the cross direction of the paper web is shown. Only the lower portion of the cutting plan shown in FIG. 3 is shown. The purpose of the calibration, the fixing of the position, in the cross direction of the paper web is to determine accurately into which roll a defect parameter or a quality deviation ends to, i.e. to calculate the position of a defect parameter or a quality deviation inside a roll.

The slitter-winder has only one camera 41 on the left side of the web for measuring the distance 00 from a fixed winding machine zero point to the paper web edge, and for detecting the calibration marks. For the correct unwind direction of one-sided material the camera can be used on the right side of the web also. The distance 42 from the first pixel of the camera 41 to a fixed point to a slitting device 43 is measured. The distance x from the paper web edge to the found defect parameter, for instance the hole 22*c*, is known as it is measured and recorded in the manufacturing or finishing process. The slitting device has slitters 44 which are placed side by side in the cross direction of the paper web. The distance 45 of the first slitter 44 from fixed point of the slitting device 43 is determined by the slitter-winder as well as the positions of the other slitters 44.

After the calibration, the fixing, the slitting lines have likely moved in the cross direction of the paper web. The positions of the slitting lines 46 after the calibration are drawn to FIG. 4.

When the paper web is then cut according to the revised cutting plan shown in FIG. 3 into several rolls, for each roll a chart of the strip-like material characteristics is generated based on the cutting patterns in the to the cross direction calibrated revised chart.

Figure 5:
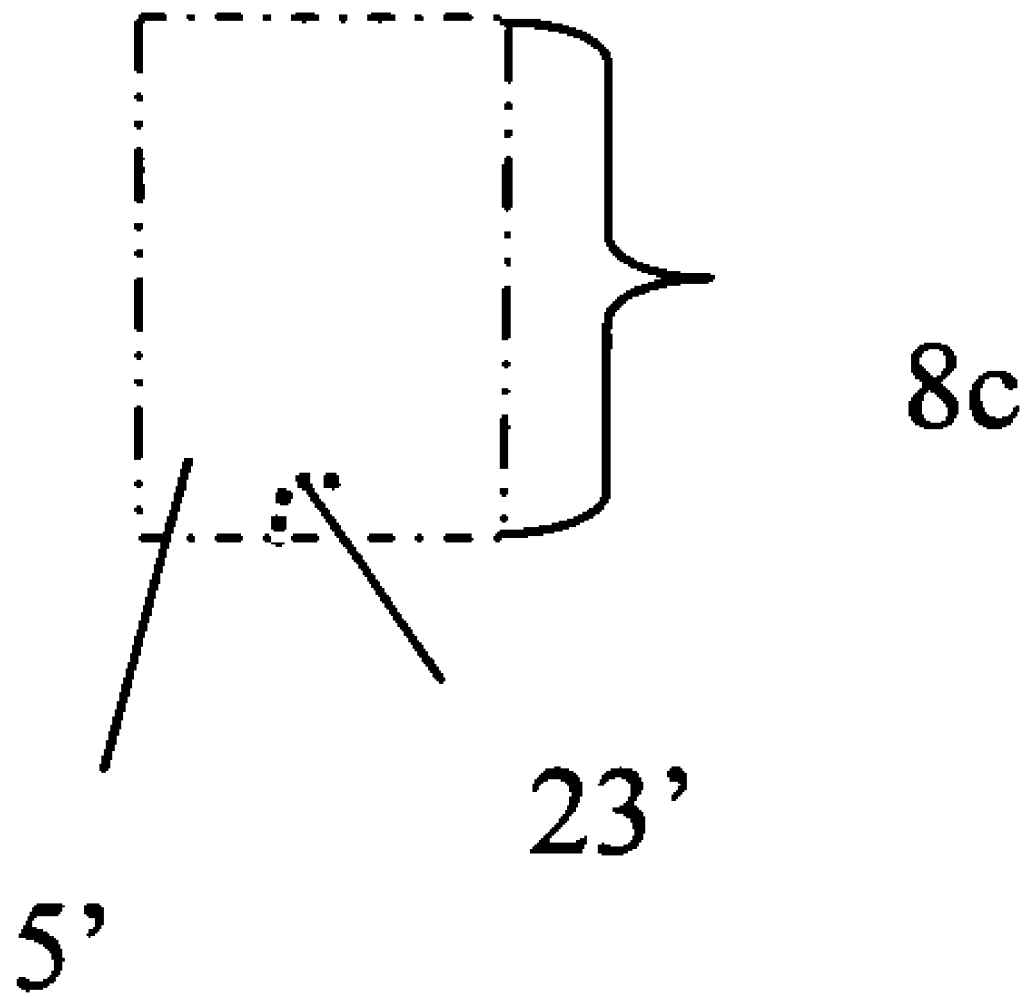
FIG. 5 presents a chart of paper roll characteristics.

FIG. 5 presents a chart of paper roll characteristics. The roll is cut according the first cutting pattern 2' being the fourth width on the left 5' and the third set 8*c*. Part of the defect parameter, the streak 23, is included to the roll.

The embodiments of the invention are described above are intended to be exemplary only. The scope of the invention is therefore intended to be limited solely by the scope of the appended claims.

The invention claimed is:

1. A method for creating a revised cutting plan for a strip-like material for maximizing a quality yield of the process, wherein a first cutting plan for a strip-like material is made based on end-product data, and the strip-like material is driven at a production speed in a manufacturing machine or in a finishing machine, and strip length data is recorded, and a chart of the strip-like material characteristics is generated and stored in a memory, wherein the strip length data is re-measured in a winding process, the recorded strip length data and the chart of the strip-like material characteristics are calibrated with calibration data in the winding process, where the calibration data is the difference between the re-measured strip length data and the recorded strip length data, and during a set change in the winding process the first cutting plan for the strip-like material is optimized for maximizing a quality yield of the process based on the end-product data and the calibrated chart of the strip-like material characteristics, and the revised cutting plan is created from the optimization result.

2. A method according to claim 1, wherein the end product data comprises end product width and at least one quality parameter and a quality class.

3. A method according to claim 1, wherein the winding process comprises a slitter-winder.

4. A method according to claim 3, wherein the positions of slitters of a slitting device in the slitter-winder are set according to cutting patterns.

5. A method according to claim 4, wherein the revised cutting plan is calibrated in the cross direction of the strip in the slitter-winder by detecting a strip edge position and a slitting device position.

6. A method according to claim 5, wherein the strip-like material is cut according to the revised cutting plan into at least one final product of the cutting process, and based on the cutting patterns in the calibrated revised cutting plan a chart of the strip-like material characteristics is generated for the final product of a cutting process.

7. A method according to claim 6, wherein the final product of the cutting process is classified based on for the final product of the cutting process generated chart of the strip-like material characteristics creating a quality class for the final product of the cutting process.

8. A method according to claim 7, wherein the quality class for the final product of the cutting process is compared to the quality class in the end-product data and if the quality class for the final product of the cutting process is lower than the quality class in end-product data the final product of the cutting process is rejected or down-graded.

9. A method according to claim 8, wherein the strip-like material is repaired and the quality class for the final product of the cutting process upgraded based on patched defect data.

10. A method according to claim 1, wherein the strip-like material is wound to form a reel or a coil, and the reel or the coil is unwound in the winding process.

11. A method according to claim 1, the strip length data is recorded by making calibration marks to the strip.

12. A method according to claim 1, wherein the strip length data is recorded by attaching RFID tags to the strip.

13. A method according to claim 11, wherein the calibration marks are made or the RFID tags are attached to the strip in pairs.

14. A method according to claim 2, wherein the quality parameter comprises at least one of the following: basis weight, density, moisture content, fibre orientation, flatness, formation, caliper, thickness, smoothness, hardness, roughness, brightness, gloss, opacity, porosity, transparency and color.

15. A method according to claim 10, wherein the strip-like material to be optimized comprises at least one of the following: the reel in the winding process, reels in a queue for the winding process, the strip-like material from the manufacturing machine and in the strip-like material from the finishing machine.

16. A method according to claim 1, wherein the chart of the strip-like material characteristics comprises: the detected defect parameters, the positions of the detected defect parameters in the cross and length direction of the strip, quality parameter deviations, the positions of quality parameter deviations in the cross and length direction of the strip.

17. A method according to claim 16, wherein the defect parameter comprises at least one of the following: a hole, a spot, a dirt particle, a wrinkle, a streak, a slime spot, an edge crack, a bump, a dent roll marks, a scratch, a slag seam, bubbles, gel, dents, thickness change, color change, a color spot.

18. A method according to claim 1, wherein the chart of the strip-like material characteristics is generated by observing the strip by at least one camera for creating at least one digital image consisting of pixels for defect parameter detection, and recording the detected defect parameters and the positions of the detected defect parameters in a cross and in a length direction of the strip, and by measuring at least one quality parameter of the strip-like material quality with at least one physical on-line measurement, and comparing the quality parameter of the strip-like material quality to a reference value for determining deviation, and recording quality parameter deviations and the positions of the quality parameter deviations in the cross and the length direction of the strip.

19. A method according to claim 1, wherein the strip-like material is paper or board.

20. A non-transitory software product data recording medium in which program code is stored, which program code will cause a computer to perform a method for creating a revised cutting plan for a strip-like material for maximizing a quality yield of the process, wherein a first cutting plan for a strip-like material is made based on end-product data, and the strip-like material is driven at a production speed in a manufacturing machine or in a finishing machine, and strip length data is recorded, and a chart of the strip-like material characteristics is generated and stored in a memory, wherein the strip length data is re-measured in a winding process, the recorded strip length data and the chart of the strip-like material characteristics are calibrated with calibration data in the winding process, where the calibration data is the difference between the re-measured strip length and the recorded strip length, and during a set change in the winding process the first cutting plan for the strip-like material is optimized for maximizing a quality yield of the process based on the end-product data and the calibrated chart of the strip-like material characteristics, and the revised cutting plan is created from the optimization result.

* * * * *